United States Patent [19]

Huisinga

[11] Patent Number: 4,930,446
[45] Date of Patent: Jun. 5, 1990

[54] METHODS FOR CONTROLLING POULTRY BARN ENVIRONMENTS

[75] Inventor: Richard D. Huisinga, Willmar, Minn.
[73] Assignee: Willmar Poultry Company, Inc., Willmar, Minn.
[21] Appl. No.: 228,390
[22] Filed: Aug. 4, 1988

Related U.S. Application Data

[63] Continuation of Ser. No. 19,032, Feb. 26, 1987.
[51] Int. Cl.$^5$ ............................................. A01K 31/20
[52] U.S. Cl. ........................................ 119/21; 119/16
[58] Field of Search ........................ 119/16, 21, 22, 45

[56] References Cited

U.S. PATENT DOCUMENTS

| | | | |
|---|---|---|---|
| 2,257,734 | 10/1941 | Cornell | 119/21 |
| 2,314,344 | 3/1943 | Cornell | 119/21 |
| 2,354,292 | 7/1944 | Waterman | 119/16 |
| 3,396,702 | 8/1968 | Trussell | 119/22 |
| 4,224,900 | 9/1980 | Truhan | 119/21 |
| 4,443,387 | 4/1984 | Gordon | 119/21 |
| 4,476,809 | 10/1984 | Bunger | 119/16 |
| 4,524,722 | 6/1985 | Siccardi | 119/21 |
| 4,721,062 | 1/1988 | Williams et al. | 119/21 |

OTHER PUBLICATIONS

Dan Foss J. (Denmark), vol. 27, No. 2, 1972.

*Primary Examiner*—Gene Mancene
*Assistant Examiner*—Michael Lynch
*Attorney, Agent, or Firm*—Palmatier & Sjoquist

[57] ABSTRACT

The present invention comprises a method for cyclically controlling a poultry barn environment. It coordinates stimulation such as illumination, ventilation, sprinkling and temperature. At the commencement of the cycle, the lights are turned off, the ventilation is reduced to a normal rate and heaters are turned on to provide an optimum environment for the poultry's inactive phase. During the dark, inactive phase, a massive purge is implemented to reduce ambient dust. At the end of the dark phase, the lights are turned on, sprinklers are turned on and the temperature in the barn is reduced. The lights stimulate activity by the fowl. The sprinkling removes still more dust from the air. The reduction in temperature stimulates feeding. At the end of the illuminated, active phase, the lights are turned out and the cycle is repeated. By coordinating the stimulation, a healthier fowl and greater growth rate are thereby produced.

39 Claims, 6 Drawing Sheets

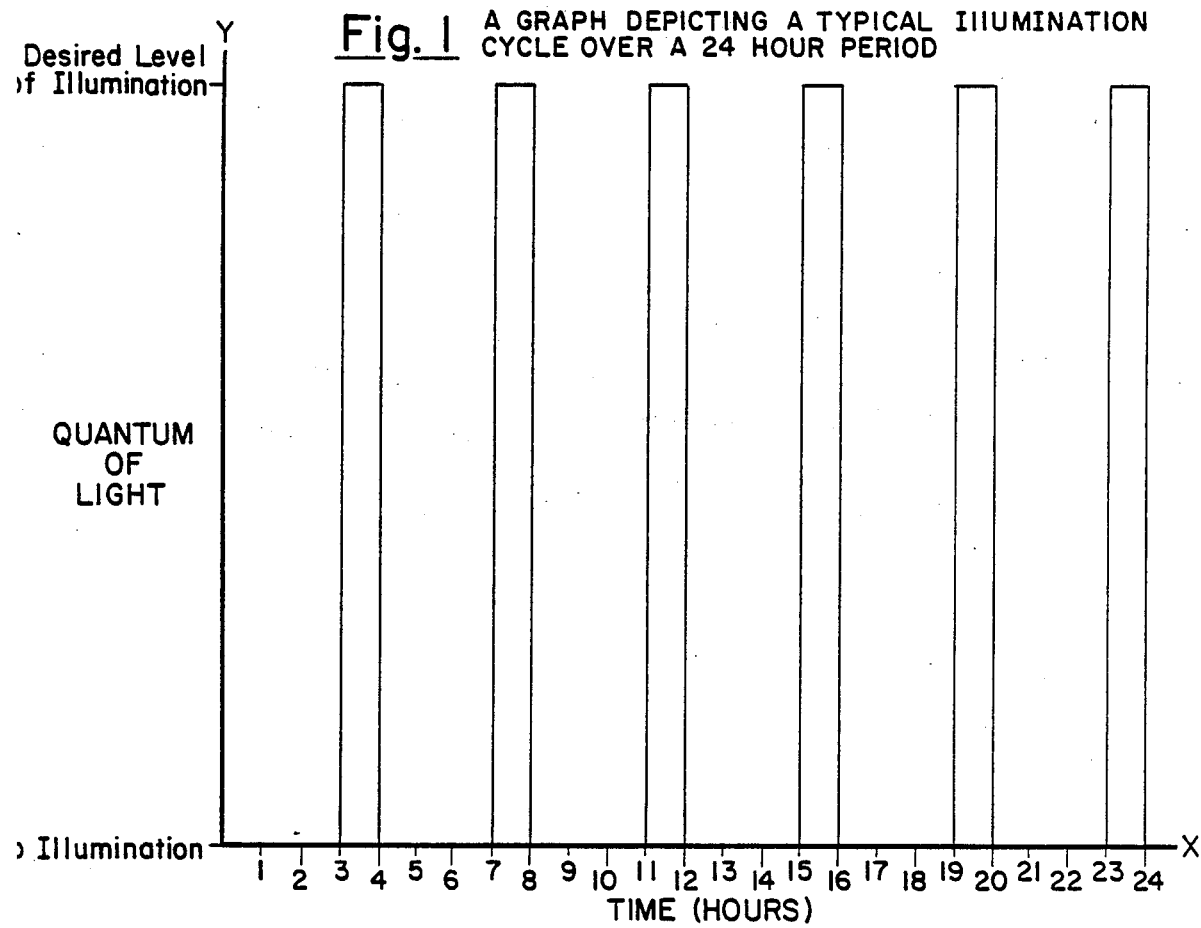
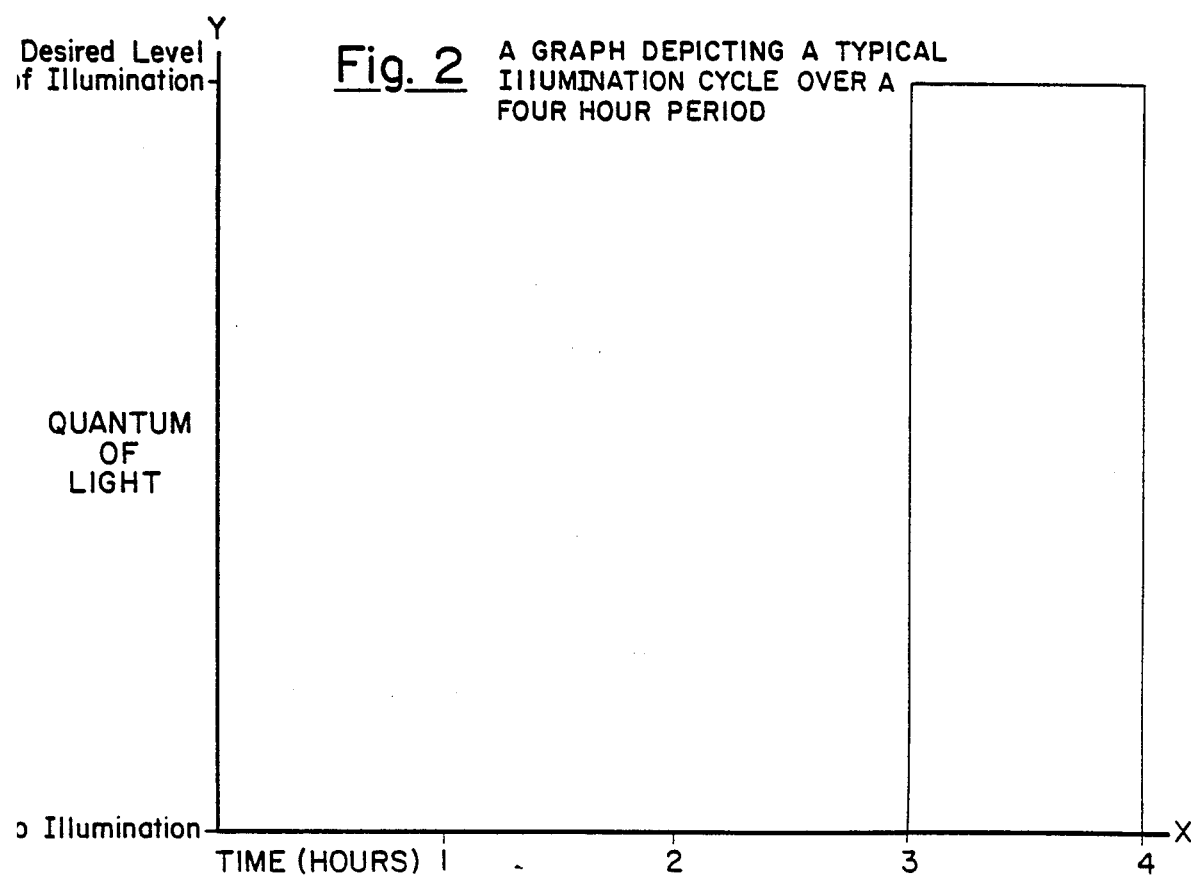

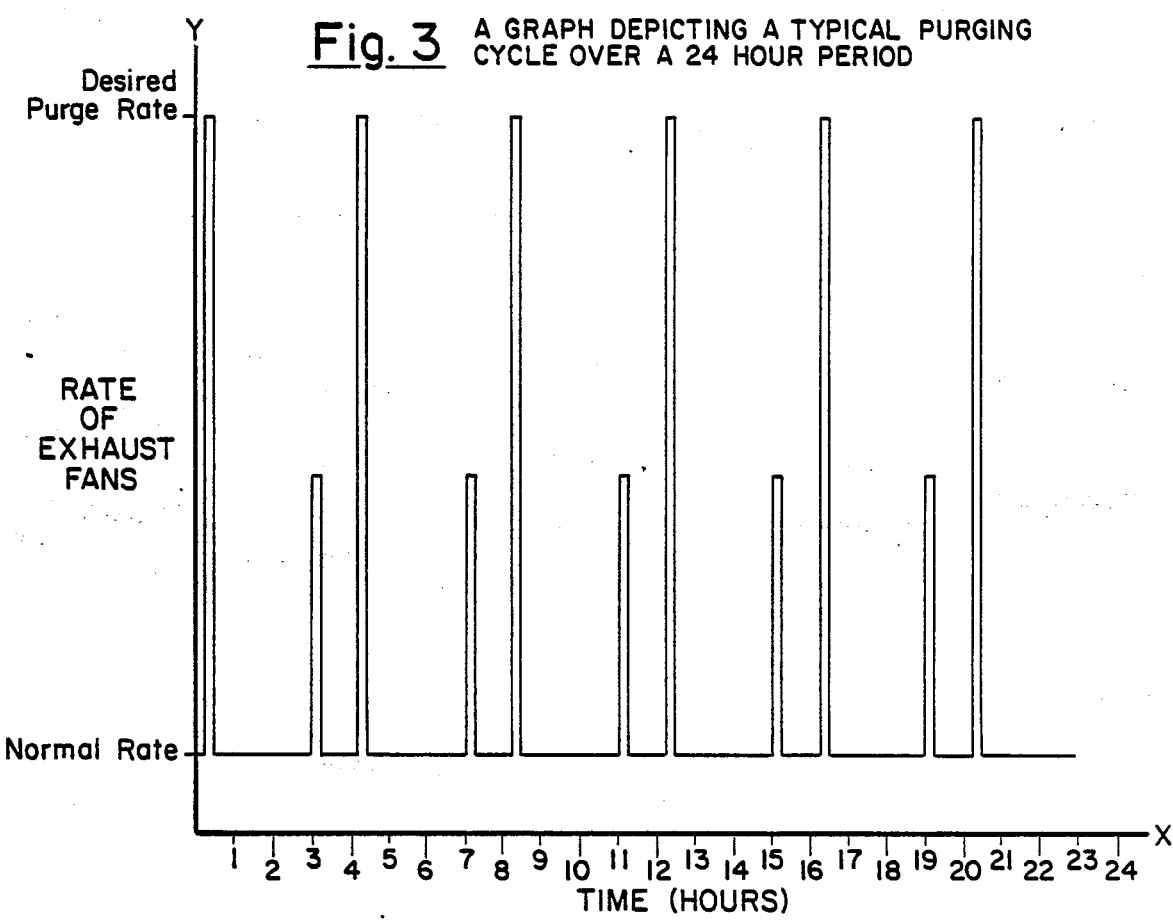
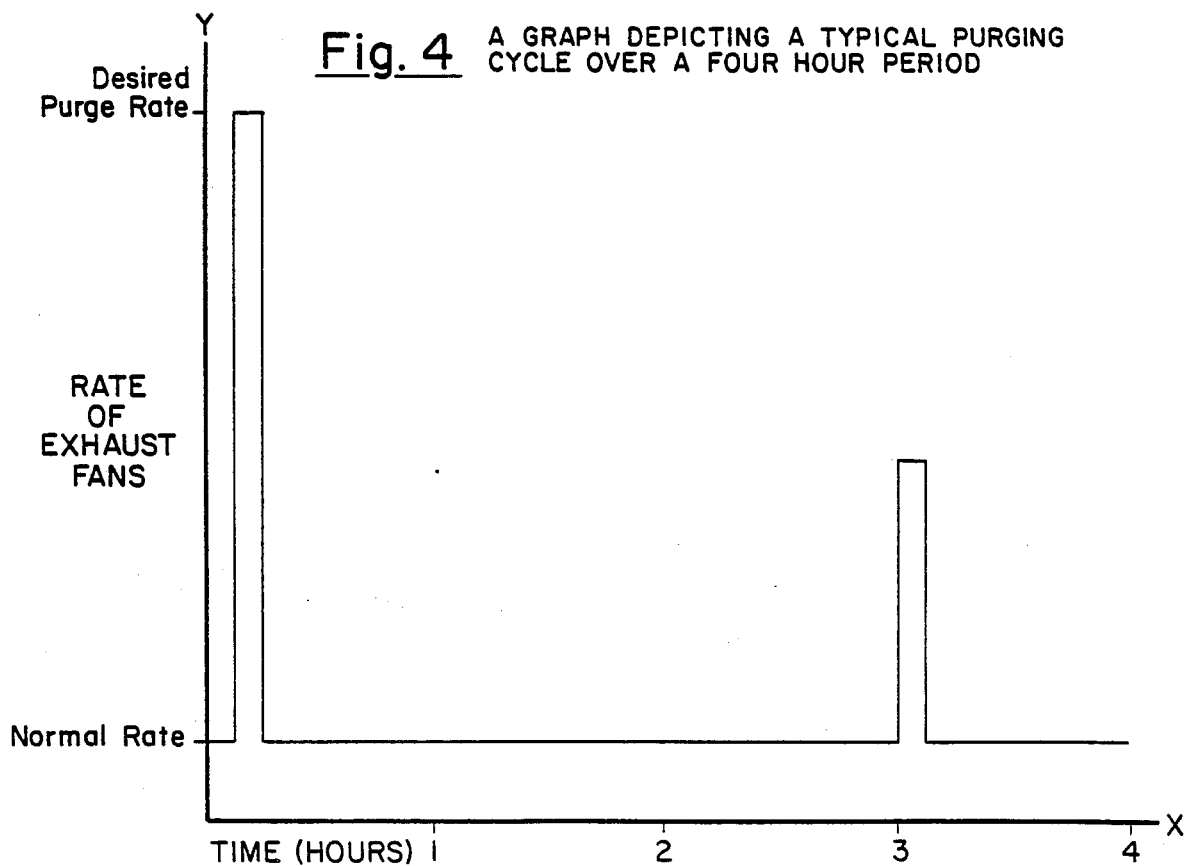

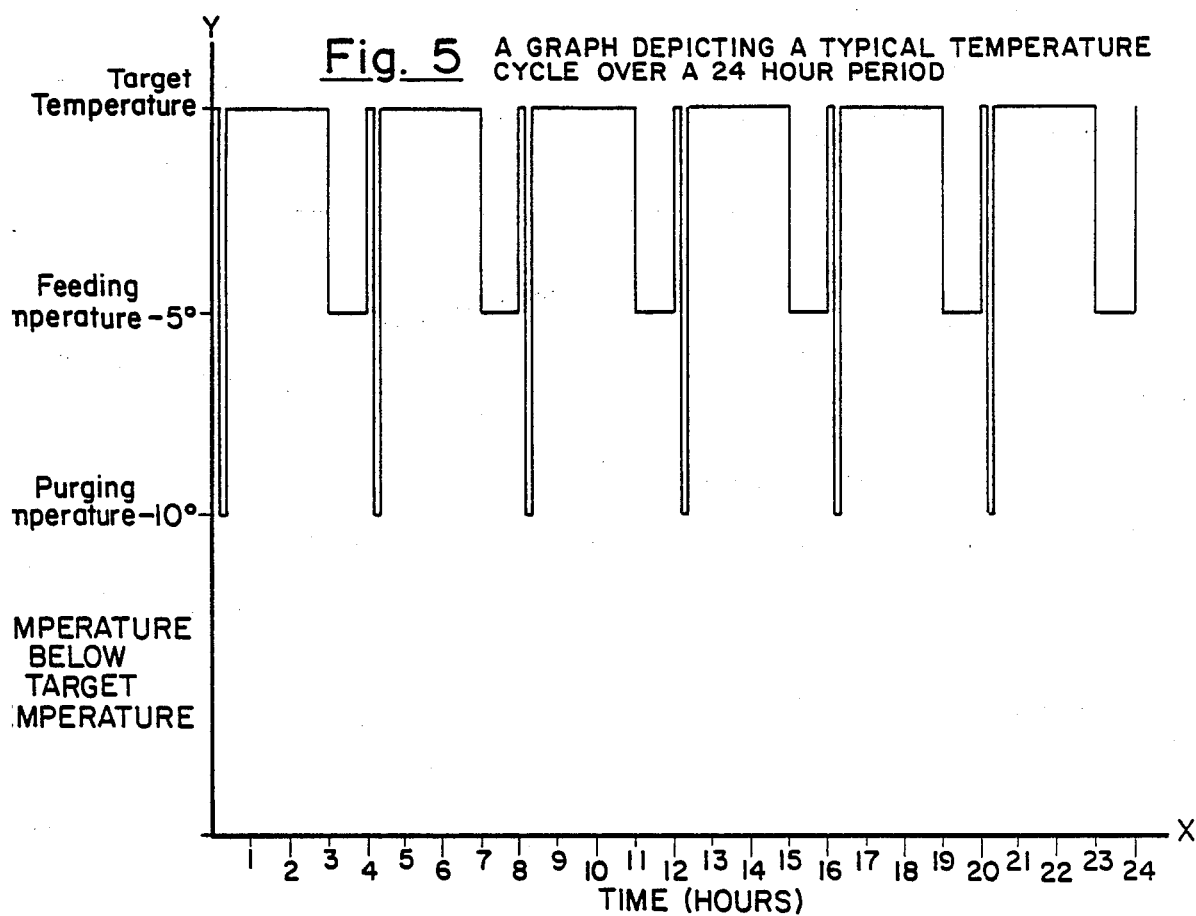
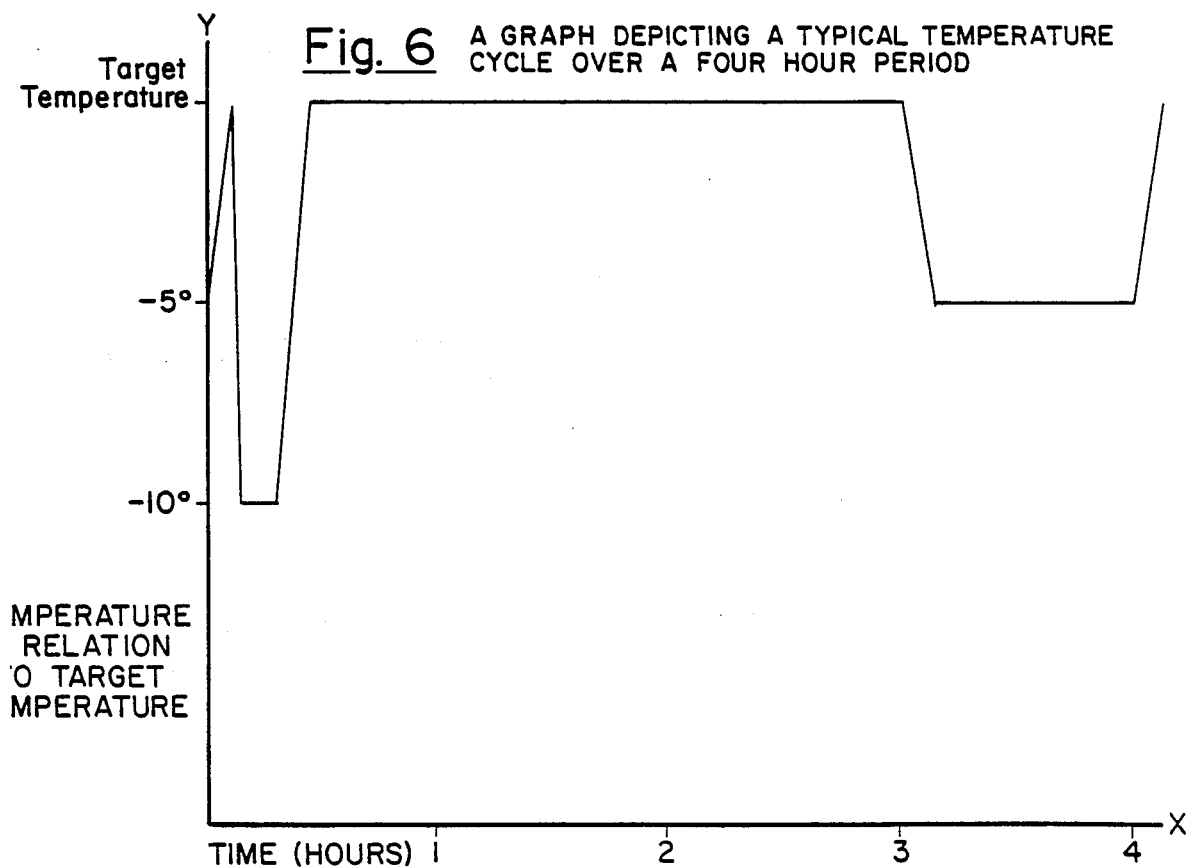

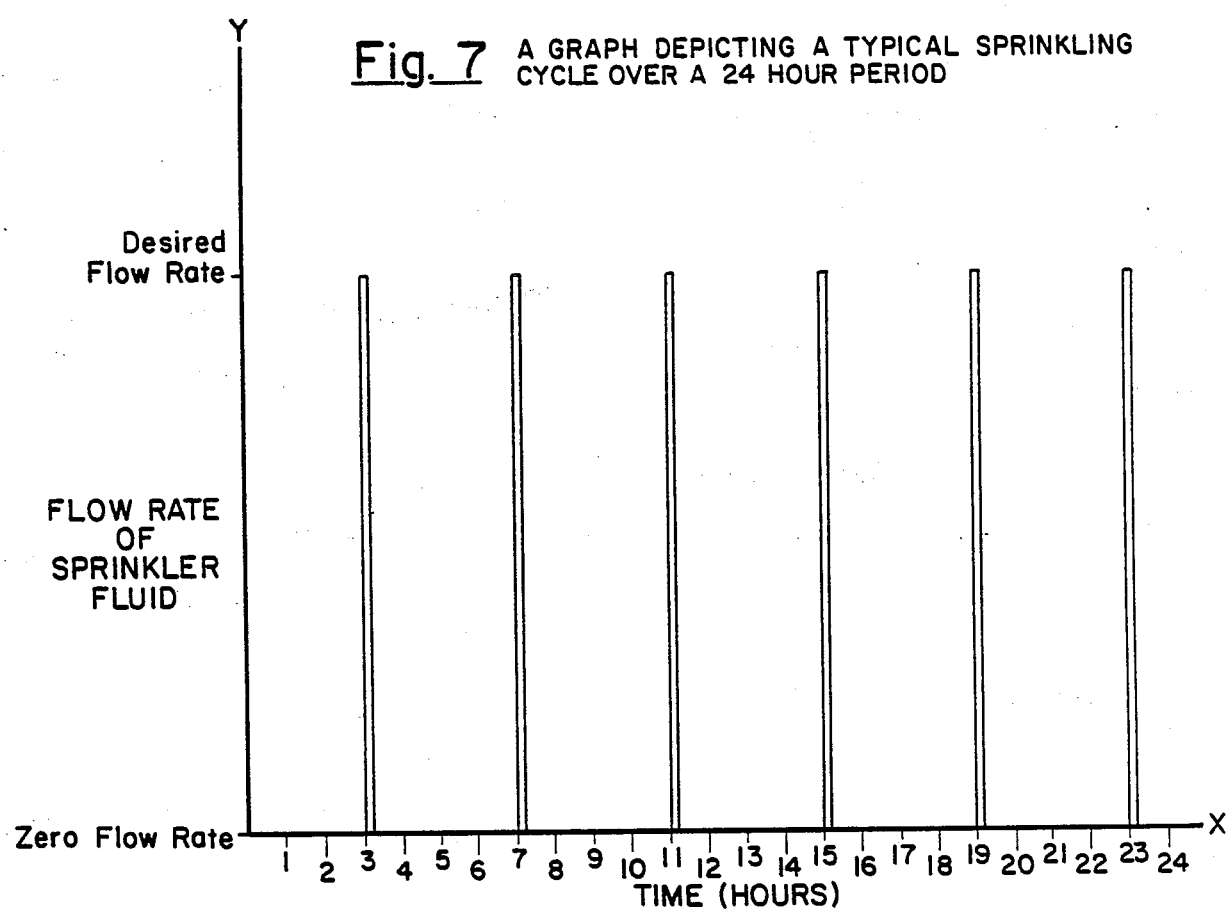
Fig. 7  A GRAPH DEPICTING A TYPICAL SPRINKLING CYCLE OVER A 24 HOUR PERIOD
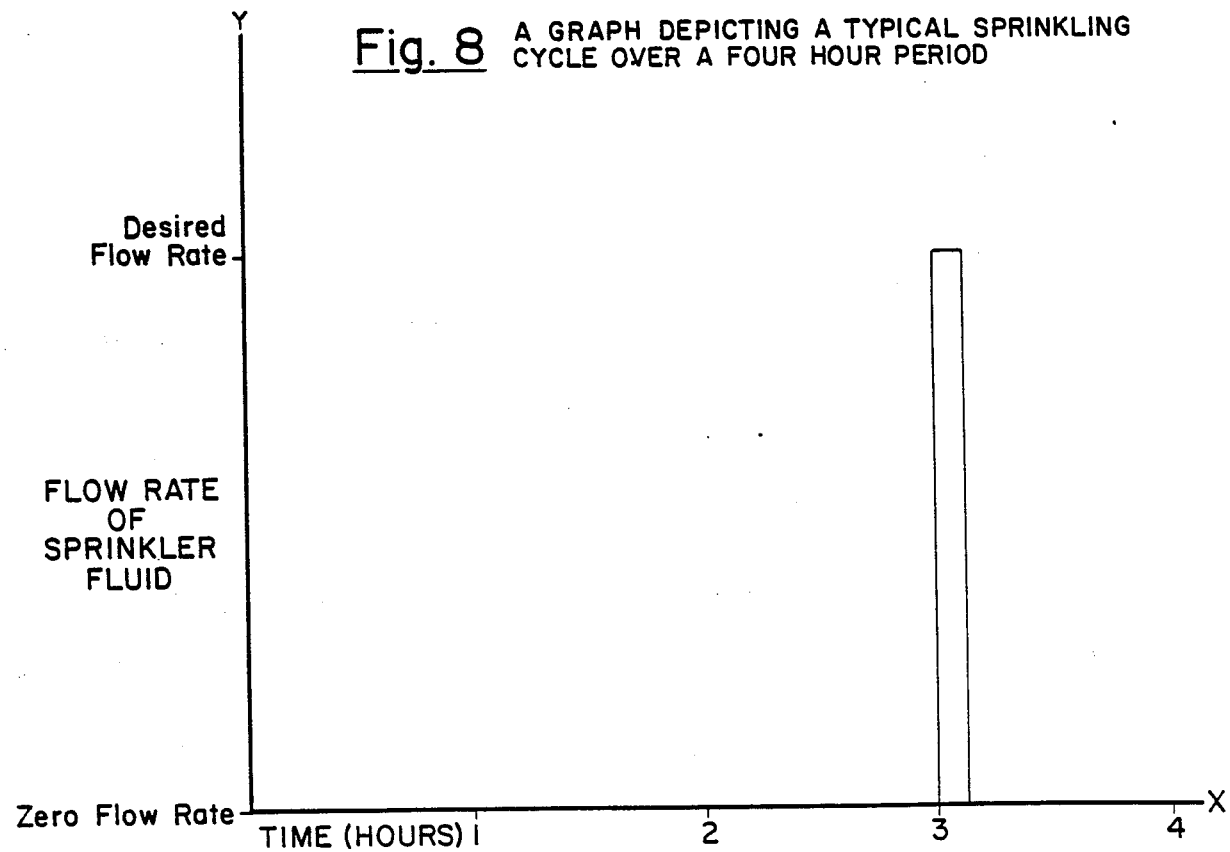
Fig. 8  A GRAPH DEPICTING A TYPICAL SPRINKLING CYCLE OVER A FOUR HOUR PERIOD

AMOUNT OF LIGHT

RATE OF VENTILATION

TEMPERATURE

FLOW RATE OF SPRINKLER FLUID (TIME HOURS)

METHODS FOR CONTROLLING POULTRY BARN ENVIRONMENTS

This application is a continuation of applicant's copending application Ser. No. 07/019,032 filed Feb. 26, 1987, now abandoned.

BACKGROUND OF THE INVENTION

1. Field of the Invention

The present invention relates to systems for controlling artificial environments and, more particularly, to systems for controlling environments in poultry barns.

2. Description of the Prior Art

Poultry barns create artificial environments. By excluding windows from, and including lights, sprinklers and ventilators in, poultry barns, the poultry barn operator shields the domestic fowl from the elements and provides a controlled environment. Thus, for all practical purposes, the poultry farmer assumes the role of Mother Nature.

Poultry farms have conventionally utilized artificial lighting on a cycling basis. For laying hens, a light/dark cycle may consist of turning the lights on for 14 hours and off for 10 hours. For poultry raised for flesh, such as turkeys and chickens, there may be more or less six light/dark cycles over a 24 hour period.

Furthermore, poultry farmers have included ventilators in their poultry barns for maintaining desired temperature and humidity conditions. An example of a ventilator is found in the copending Huisinga Application Ser. No. 798,993, filed 11/18/85, which discloses a ridge ventilating device that allows for the passive ventilation of agricultural buildings. Other ventilators may be wall mounted blowers, exhausting air to the outside.

Sprinklers and ventilators are typically manually operated on an as needed basis. The poultry farmer sporadically checks the dust or humidity levels and either turns on the sprinklers or opens the ventilators accordingly. Typically, for poultry raised for flesh, the farmer monitors the poultry's environment more frequently for young birds than for older birds.

SUMMARY OF THE INVENTION

The present invention comprises a method for controlling the environment within a poultry barn so as to stimulate the growth of domestic fowls, such as chickens, turkeys, ducks, or geese, which are raised for flesh. The method involves the coordination of an illumination cycle with temperature, sprinkling and ventilation cycles.

The illumination cycle is a light/dark cycle. It simulates day and night in that there may be illuminated and unilluminated conditions inside the poultry barn. However, in contrast to one cycle per mean solar day, the illumination cycle may be repeated typically six times every 24 hours.

The coordination of a temperature cycle with the illumination cycle comprises basically two steps. The first step is defining a target temperature. The target temperature is defined by various factors such as the type and age of the fowl. It is then maintained without illumination for a predetermined length of time. The second step comprises turning on the lights and dropping the temperature simultaneously. The illumination and lower temperature is then maintained for a predetermined length of time. At the end of the second step, the temperature will be raised and the lights turned off, thus completing the cycle. The purpose behind coordinating variations in illumination and temperature is to stimulate feeding.

The present invention also comprises the coordination of a sprinkling cycle with the illumination cycle. A fluid is sprayed in the air of the poultry barn at or near the beginning of the light cycle. The fluid is sprinkled for a predetermined length of time, typically 30 seconds to five minutes. The fluid, typically water, is sprinkled from a height of approximately eight feet or higher to remove dust particles from the air.

The present invention still further comprises the coordination of a ventilation or purging cycle with the illumination cycle. A ventilation or massive purge of dust laden barn air occurs after the lights have been turned off, typically six to eight minutes thereafter, and after the domestic fowl have settled down. A timing, noise or motion sensor may be used to trigger the purge. The purge, which typically is maintained for two to ten minutes, carries the air and dust particles and other impurities from the barn and is accomplished by opening intake vents, a ridge vent formed in the apex of the roof or blowing air from the barn with exhaust fans, or by utilizing a combination thereof. The length of the purge may be terminated by a timing, temperature, laser or dust sensor. Since a by-product of the purge is a drop in temperature, it is beneficial for the poultry farmer to raise the temperature of the poultry barn back to the target temperature at the completion of the purge.

The advantages of the present invention include a greater growth rate for the domestic fowl. Reducing the temperature during the light phase stimulates the fowl's appetite, thereby providing a greater weight gain. Sprinkling to remove the dust during the illuminated, most active phase of the fowl, provides a cleaner, healthier environment for the feeding fowl, thereby producing a still greater weight gain. Purging the poultry barn to remove dust during the dark phase after the fowl have settled down provides a thorough cleaning of the poultry barn at an opportune time, i.e. during the most inactive stage of the fowl, thereby allowing as little inhalation as possible of the briskly moving, dust laden air and producing a healthier fowl.

Another advantage of the present invention is that it provides a more efficient poultry barn. The computerized coordination of stimuli not only produces a healthier fowl, but frees the poultry barn operator to perform less mundane tasks than continually monitoring on a daily, or even more frequent, level, the ever-changing status of the fowl. Instead of the barn operator, the invention coordinates and changes the stimuli, i.e. the illumination, temperature, purging and sprinkling cycles, for as long as is needed, typically two to twenty weeks, in response to a number of factors such as the type and age of the fowl. Besides taking over the mundane tasks of the poultry barn operator for two to twenty weeks, the invention saves energy and water by delivering precisely the amount of electricity and water that is needed.

BRIEF DESCRIPTION OF THE DRAWINGS

FIG. 1 shows a graph depicting a typical illumination cycle over a 24 hour period.

FIG. 2 shows a graph depicting a typical illumination cycle over a four hour period.

FIG. 3 shows a graph depicting a typical purging cycle over a 24 hour period.

FIG. 4 shows a graph depicting a typical purging over a four hour period.

FIG. 5 shows a graph depicting a typical temperature cycle over a 24 hour period.

FIG. 6 shows a graph depicting a typical temperature cycle over a four hour period.

FIG. 7 shows a graph depicting a typical sprinkling cycle over a 24 hour period.

FIG. 8 shows a graph depicting a typical sprinkling cycle over a four hour period.

DETAILED DESCRIPTION OF THE PREFERRED EMBODIMENTS

The present invention comprises a method for controlling a poultry barn's environment. The invention coordinates stimuli such as illumination, ventilation, temperature and sprinkling on a systematic cycling basis to stimulate the growth of domestic fowl, which are raised for flesh, including chickens, turkeys, ducks and geese.

Figure 9A:
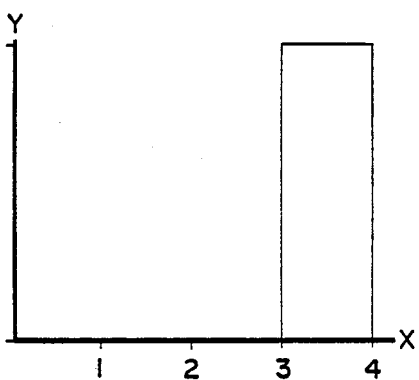
FIG. 9 shows scaled-down versions of FIGS. 2, 4, and 8 formed in a column-like array for easy reference.
Figure 10:
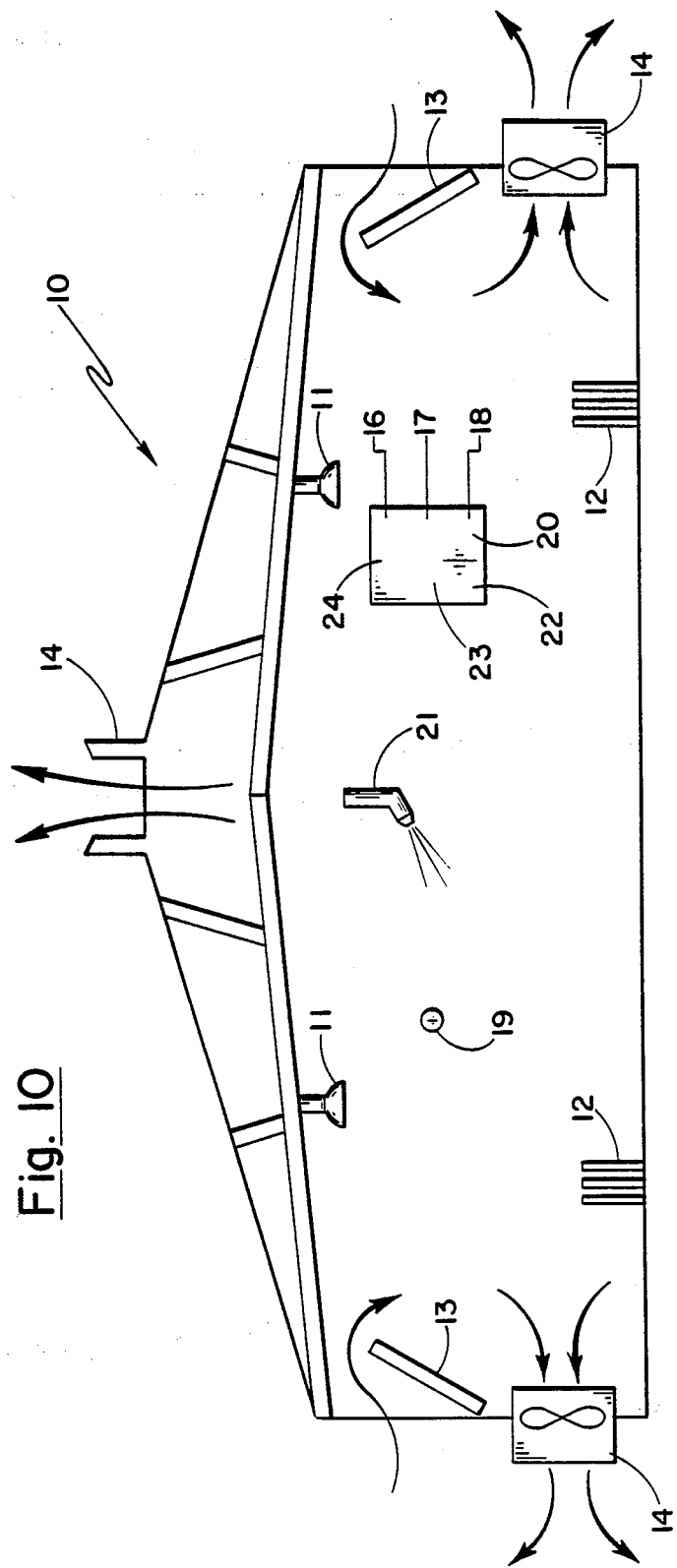
FIG. 10 shows a schematic diagram of a poultry barn.

At the commencement of the first hour, a plurality of lights 11 are turned out to darken the interior of the poultry barn 10. (See FIG. 9a depicting a typical four hour illumination cycle and FIG. 10 depicting a poultry barn.) Consequently, the fowl stray from their feeding bins and begin to settle down. They become less vocal and less active. Dust, created by the fowl's activity, remains in the air.

Figure 9B:
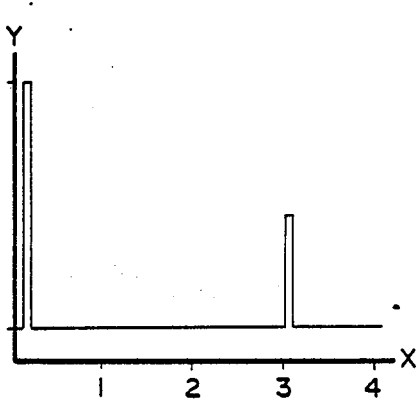
Figure 9C:
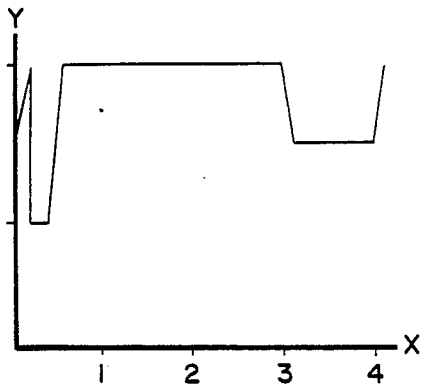

As the lights go out, a plurality of heaters 12 are turned on. The temperature in the poultry barn 10 is increased from a cooler feeding temperature, previously maintained during a light portion of the cycle, to a warmer, targeted temperature during the fowl's inactive stage. (See FIG. 9c depicting a typical four hour temperature cycle.) Simultaneously with turning off the lights 11 and turning on the heaters 12, a plurality of intake vents 13 and a ridge vent 14 may be partially or completely closed to reduce the ventilation in the barn 10, thereby allowing the heaters 12 to increase the temperature of the poultry barn 10 to a level conducive for inactive fowl. However, except during the short summer season, it should be noted that the ventilating means 13-15, i.e. the intake vents 13, the ridge vent 14 or a plurality of wall mounted exhaust fans 15, may have been shut down earlier in the cycle when the temperature of the poultry barn 10 attained the feeding level. (See FIG. 9b depicting a typical four hour ventilation cycle.)

After the fowl have settled down, typically six to eight minutes from the beginning of the first hour, a massive purge or ventilation of the atmosphere of the poultry barn 10 may be implemented to remove the dust laden air. (See FIG. 9b.) A timing sensor 16 may trigger the purge. Alternatively, a noise sensor 17 or a motion sensor 18 may sense the decrease in the fowl's activity and thereby trigger the purge after the quiescent period.

The purge may be effectuated by active or passive ventilation or by utilizing a combination thereof. Active ventilation may be accomplished by starting the wall mounted exhaust fans 15. Passive ventilation may be accomplished by opening the intake vents 13 and/or the ridge vent 14 formed in the apex of the roof of the barn 10, such as is shown in the co-pending and commonly owned Huisinga application Ser. No. 798,993, filed Nov. 18, 1985.

The purge is typically maintained for two to ten minutes. The dust laden air is exhausted from the barn 10 at a sufficient rate to remove as much of the dust as possible without disturbing the fowl. Fresh air is drawn in through the intake vents 13 and thus the purge is accompanied by a reduction in temperature which may be as much as 30° F. below the target temperature.

The frequency, intensity and length of the purging phase, as well as the illumination or unillumination phase, may vary according to different factors such as the type and age of the fowl, the amount of dust laden air in the poultry barn and the temperature outside the poultry barn. The frequency is defined as the time between purging or illumination phases. The intensity is defined as the rate of ventilation or volume of air ventilated over a given period of time or the amount of light. The length is defined as the period of time of the purge or illumination phases.

Once the amount of dust decreases to a desired level, the purge is terminated. A timer 16 may terminate the purge after a predetermined length of time. Alternatively, a laser 19 or a dust sensor 20 may sense the decreased level of dust and thus terminate the purge or a temperature sensor 23 may sense that the temperature is approaching an undesirable temperature and thus terminate the purge.

Upon completion of the purge, the temperature of the barn 10 may be lower than desired. The intake of fresh air during the purge may have not only reduced the level of dust, but reduced the temperature as well. Therefore, at the completion of the purging phase, it may be necessary to heat the barn 10 back to its desired temperature level.

Throughout the remaining portion of the first hour, the second hour, and the third hour, the status quo is maintained. The poultry barn 10 is kept dark. The ventilation is maintained at a normal rate and the temperature is maintained at a predetermined target level by active or passive ventilation or by a combination thereof.

During the maintenance of the status quo, the fowl may be inactive, perhaps in response to the absence of stimulation. They may tend to feed less. They may be less mobile and vocal and rest or sleep. A slight raise in temperature, perhaps 2° to 3° F., may be the only stimulation that may occur as the fowl may tolerate a slightly higher temperature when they are sleeping.

Figure 9D:
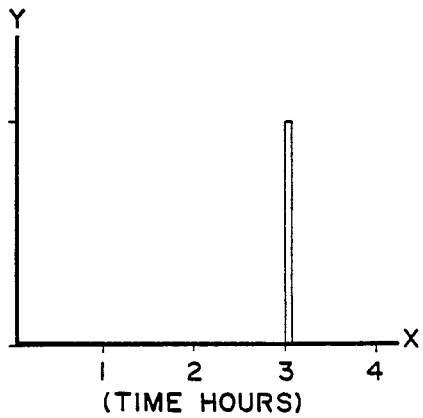

At the commencement of the fourth hour, the status quo is disrupted. The lights 11 are turned on. A plurality of sprinklers 21 may be turned on. (See FIG. 9d depicting a typical four hour sprinkling cycle.) The exhaust fans 15, intake vents 13, ridge vents 14, or a combination thereof, are operated to take in fresh, colder air and thereby reduce the temperature of the barn.

The stimulation, i.e. the illumination, ventilation and thus reduction in temperature, and sprinkling are triggered typically by the timing device 16 and commence typically at the beginning of the fourth hour. However, it should be noted that although the illumination and ventilation are typically turned on at the commencement of the fourth hour, it may be desirable to delay for more or less five minutes the operation of the sprinklers 21.

In response to the illumination, the fowl become active. In response to the reduction in temperature and illumination the fowl begin to feed. Therefore, since the illumination and reduction in temperature is coordinated, a greater growth rate is produced.

The sprinkling also contributes to a greater growth rate by providing a healthier environment. The sprinkling not only directly reduces the amount of dust in the air, but wets the surfaces and shavings in the barn with a fluid, typically water, to thereby indirectly reduce the amount of dust which may be placed into the air by the subsequent activities of the fowl, as the fowl create the most dust during the early stages of the light phase. With less dust in the air, a healthier environment and thus healthier fowl is produced.

The sprinklers 21, which typically are installed about eight feet above the fowl, may remain on for 30 seconds or five minutes, or shorter or longer. Like the length of the sprinkling phase, the amount of fluid sprinkled or the intensity of the sprinkling and the frequency with which the sprinkling phase occurs may vary depending upon a number of factors, such as the type of age of the fowl, the amount of water available, or the type of shavings in the barn. It should be noted that the sprinklers 21 may be lawn type sprinklers.

The sprinkling may be terminated by the timing sensor 16. It may also be terminated by the dust sensor 20, which may sense the amount of dust in the air of the barn 10, or a humidity sensor 22, which may sense when the humidity reaches an undesirable level and then terminate the sprinklers.

The ventilation, which reduces the temperature of the barn to the desired feeding temperature, may be maintained at a rate above the normal rate for 20 seconds to one hour. If the temperature outside the barn 10 is twenty degrees below zero Fahrenheit, the ventilation means 13-15 may be opened only 20 seconds to reduce the temperature inside the barn 10 to the feeding temperature, which may then be maintained throughout the rest of the fourth hour by the normal ventilation rate. On the other hand, if the outside temperature is only a few degrees below the target temperature, the ventilation may need to be maintained at a high rate throughout the fourth hour to keep the inside temperature at the feeding temperature.

The ventilation may be terminated by the temperature sensor 23 when the inside temperature reaches the desired feeding temperature, typically one to thirty degrees below the target temperature maintained during the dark, inactive phase. If the inside temperature should rise during the feeding phase, the temperature sensor 23 may trigger the operation of the ventilation means 13-15 and subsequently terminate it when the feeding temperature is again attained. The ventilation, and thus reduction in temperature, may also be terminated by the timing sensor 16.

The frequency, length and intensity of the temperature phase may vary according to different factors, such as the type and age of the fowl and, of course, the outside temperature. The frequency is defined as the time between temperature reduction phases. The intensity is defined as the amount of temperature reduction. The length is defined as the period of time for which the temperature is reduced.

At the end of the fourth hour the lights 11 may be turned off. The ventilation may also be reduced to the normal rate, unless it had previously been reduced by the temperature sensor 23 when the feeding temperature had been attained. Furthermore, the heaters 12 may be turned on to bring the temperature of the barn 10 back to the desired target temperature for inactive fowl.

The four hour cycle as recited above is then repeated over and over again until the fowl have attained a marketable age and weight. Moreover, the frequencies, intensities, and lengths of the illumination, purging, sprinkling and temperature fluctuation cycles may be continually and automatically adjusted to correspond with the ever-changing age, needs, and environment of the fowl to thereby provide an optimum growth rate for the fowl and an efficient poultry barn for the poultry barn operator.

It should be noted that a control device or computer 24 receives and sends signals to and among the lights 11, the heaters 12, the intake vents 13, the ridge vent 14, the wall mounted exhaust fans 15, the timing sensor 16, the noise sensor 17, the motion sensor 18, the laser 19, the dust sensor 20, the sprinklers 21, the humidity sensor 22 and the temperature sensor 23. The computer 24 may be programmed to operate the cycle and coordinate and continually automatically adjust the stimulation according to the type and age of the fowl for up to twenty weeks or more, or for the length of time it takes for fowl to grow to a marketable weight and age. Of course, the cycle may be operated manually if so desired.

What is claimed is:

1. A method for controlling the environment within the interior of a poultry barn for domestic fowl raised for flesh comprising the steps of:
    (a) daily illuminating the poultry barn on a cyclical basis, said illuminating step comprising at least one illumination phase and at least one unillumination phase; and
    (b) purging air from the poultry barn on a cyclical basis, said purging occurring in said unillumination phase to purge the barn of dust when the domestic fowl are inactive.

2. The method of claim 1 further comprising the step of fluctuating the temperature in the poultry barn on a cyclical basis and coordinating the cycles of temperature fluctuation with the illuminating cycles, each temperature cycle including at least one target phase and at least one colder phase, said colder phase occurring with said illumination phase to stimulate feeding by the domestic fowl.

3. The method of claim 1 further comprising the step of sprinkling the poultry barn interior on a cyclical basis, said sprinkling step occurring in said illumination phase to remove dust from the air and to wet the poultry barn interior for an active stage of the domestic fowl.

4. The method of claim 1 further comprising the step of allowing a quiescent period immediately following the start of said unillumination phase to allow the fowl to settle down, said purging step immediately following said quiescent period.

5. The method of claim 1 wherein the step of purging includes:
    (a) triggering said purging by a sensing means; and
    (b) terminating said purging by a sensing means, said sensing means located in the interior of the barn.

6. The method of claim 1 wherein the step of purging includes:
    (a) sensing the temperature of the poultry barn with a temperature sensor during said purging step; and
    (b) terminating said purging if the temperature of the poultry barn approaches an undesirable temperature.

7. The method of claim 1 wherein said illuminating and purging cycles are repeated a multiplicity of times each day.

8. The method of claim 7 wherein each illuminating cycle has a duration of approximately four hours.

9. The method of claim, wherein the step of purging includes sensing a condition of dust in the poultry barn interior and producing an indication of the sensed condition and starting and ending the purging air cycle in response to the sensed condition.

10. The method of claim 1, wherein the step of purging includes sensing a condition of time in the poultry barn interior and producing an indication of the sensed condition and starting and ending the purging air cycle in response to the sensed condition.

11. The method of claim 1, wherein the step of purging includes sensing a condition of temperature in the poultry barn interior and producing an indication of the sensed condition and starting and ending the purging air cycle in response to the sensed condition.

12. The method of claim 1, wherein the step of purging includes sensing a condition of noise in the poultry barn interior and producing an indication of the sensed condition and starting and ending the purging air cycle in response to the sensed condition.

13. The method of claim 1, wherein the step of purging includes sensing a condition of motion in the poultry barn interior and producing an indication of the sensed condition and starting and ending the purging air cycle in response to the sensed condition.

14. The method of claim 1, wherein the step of purging includes sensing a condition of light in the poultry barn interior and producing an indication of the sensed condition and starting and ending the purging air cycle in response to the sensed condition.

15. A method of controlling the environment within the interior of a poultry barn for domestic fowl raised for flesh comprising the steps of:
   (a) daily illuminating the poultry barn on a cyclical basis, said illuminating step comprising at least one illumination phase and at least one unillumination phase; and
   (b) fluctuating the temperature in the poultry barn on a cyclical basis and coordinating the cycles of temperature fluctuation with the illuminating cycles, each temperature cycle including at least one target phase and at least one colder phase, said colder phase occurring with said illumination phase to stimulate feeding by the domestic fowl.

16. The method of claim 15 further comprising the step of purging air from the poultry barn on a cyclical basis, said purging step occurring in said unillumination phase to purge the barn of dust when the domestic fowl are inactive.

17. The method of claim 15 further comprising the step of sprinkling the poultry barn interior on a cyclical basis, said sprinkling step occurring in said illumination phase to remove dust from the air and to wet the poultry barn interior for an active stage of the domestic fowl.

18. The method of claim 15 wherein said colder phase is in a range from 1° F. to 30° F. colder than said target phase.

19. The method of claim 15 wherein the step of fluctuating the temperature includes:
   (a) triggering said fluctuating step by a sensing means; and
   (b) terminating said fluctuating step by a sensing means, said sensing means located in the interior of the barn.

20. The method of claim 15 wherein said step of fluctuating includes:
   (a) triggering intermittently said step of fluctuating during said colder phase whenever the temperature in the barn rises above the feeding temperature; and
   (b) terminating intermittently said step of fluctuating during said colder phase whenever the temperature in the barn attains the feeding temperature, said triggering and terminating accomplished by a temperature sensor, said triggering and terminating maintaining a feeding temperature.

21. The method of claim 15, wherein the step of fluctuating the temperature includes sensing a condition of dust in the poultry barn interior and producing an indication of the sensed condition and starting and ending the temperature fluctuation cycle in response to the sensed condition.

22. The method of claim 15, wherein the step of fluctuating the temperature includes sensing a condition of time in the poultry barn interior and producing an indication of the sensed condition and starting and ending the temperature fluctuation cycle in response to the sensed condition.

23. The method of claim 15, wherein the step of fluctuating the temperature includes sensing a condition of temperature in the poultry barn interior and producing an indication of the sensed condition and starting and ending the temperature fluctuation cycle in response to the sensed condition.

24. The method of claim 15, wherein the step of fluctuating the temperature includes sensing a condition of noise in the poultry barn interior and producing an indication of the sensed condition and starting and ending the temperature fluctuation cycle in response to the sensed condition.

25. The method of claim 15, wherein the step of fluctuating the temperature includes sensing a condition of motion in the poultry barn interior and producing an indication of the sensed condition and starting and ending the temperature fluctuation cycle in response to the sensed condition.

26. The method of claim 15, wherein the step of fluctuating the temperature includes sensing a condition of light in the poultry barn interior and producing an indication of the sensed condition and starting and ending the temperature fluctuation cycle in response to the sensed condition.

27. A method for controlling the environment within the interior of a poultry barn for domestic fowl raised for flesh comprising the steps of:
   (a) daily illuminating the poultry barn on a cyclical basis, said illuminating step comprising at least one illumination phase and at least one unillumination phase; and
   (b) sprinkling the poultry barn interior on a cyclical basis, said sprinkling occurring in said illumination phase to remove dust from the air and to wet the poultry barn interior for an active stage of the domestic fowl.

28. The method of claim 27 further comprising the step of purging air from the poultry barn on a cyclical basis, said purging step occurring in said illumination phase to purge the barn of dust when the domestic fowl are inactive.

29. The method of claim 27 further comprising the step of fluctuating the temperature in the poultry barn on a cyclical basis and coordinating the cycles of temperature fluctuation with the illuminating cycles, each temperature cycle including at least one target phase and at least one colder phase, said colder phase occurring with said illumination phase to stimulate feeding by the domestic fowl.

30. The method of claim 27 wherein said sprinkling step commences at the beginning of said illumination phase.

31. The method of claim 27 wherein said sprinkling includes spraying a fluid from sprinklers located over the fowl and removes and settles ambient dust.

32. The method of claim 27 wherein said step of sprinkling includes:
 (a) triggering said sprinkling by a sensing means; and
 (b) terminating said sprinkling by a sensing means, said sensing means located in the interior of the barn.

33. The method of claim 27, wherein the step of sprinkling includes sensing a condition of dust in the poultry barn interior and producing an indication of the sensed condition and starting and ending the sprinkling cycle in response to the sensed condition.

34. The method of claim 27, wherein the step of sprinkling includes sensing a condition of time in the poultry barn interior and producing an indication of the sensed condition and starting and ending the sprinkling cycle in response to the sensed condition.

35. The method of claim 27, wherein the step of sprinkling includes sensing a condition of temperature in the poultry barn interior and producing an indication of the sensed condition and starting and ending the sprinkling cycle in response to the sensed condition.

36. The method of claim 27, wherein the step of sprinkling includes sensing a condition of noise in the poultry barn interior and producing an indication of the sensed condition and starting and ending the sprinkling cycle in response to the sensed condition.

37. The method of claim 27, wherein the step of sprinkling includes sensing a condition of motion in the poultry barn interior and producing an indication of the sensed condition and starting and ending the sprinkling cycle in response to the sensed condition.

38. The method of claim 27, wherein the step of sprinkling includes sensing a condition of light in the poultry barn interior and producing an indication of the sensed condition and starting and ending the sprinkling cycle in response to the sensed condition.

39. A method for controlling the environment within the interior of a poultry barn for domestic fowl raised for flesh comprising the steps of:
 (a) illuminating the poultry barn environment on a cyclical basis repeated a multiplicity of times each day,
 (b) purging air from the poultry barn environment on a cyclical basis, said purging cycle comprising at least one purging phase and at least one normal phase, each said phase comprising a frequency, an intensity and a length, said purging cycles being coordinated with the illuminating cycles and at least one said purging phase occurring in an unillumination phase to purge the barn of dust when the domestic fowl are inactive;
 (c) fluctuating the temperature of the poultry barn environment on a cyclical basis, said fluctuating being effectuated in part by purging air from the poultry barn to lower the temperature, said fluctuating cycle comprising at least one target phase and at least one colder phase, each said phase comprising a frequency, an intensity and a length, said fluctuating cycles being coordinated with the illuminating cycles and said colder phase occurring in an illumination phase to stimulate feeding by the domestic fowl,
 (d) sprinkling the poultry barn environment on a cyclical basis, said sprinkling cycle comprising at least one wet phase and at least one dry phase, each said phase comprising a frequency, an intensity and a length, said sprinkling cycles being coordinated with the illuminating cycles and said wet phase occurring in said illumination phase to remove dust from the air and to wet the poultry barn environment for an active stage of the domestic fowl; and
 (e) adjusting said frequencies, said intensities, and said lengths of said phases of said illuminating, purging, fluctuating and sprinkling cycles with each other.

* * * * *

UNITED STATES PATENT AND TRADEMARK OFFICE
CERTIFICATE OF CORRECTION

PATENT NO. : 4,930,446

DATED : June 5, 1990

INVENTOR(S) : Richard D. Huisinga

It is certified that error appears in the above-identified patent and that said Letters Patent is hereby corrected as shown below:

In column 7, line 1, after "claim", insert --1--.

Signed and Sealed this

Tenth Day of March, 1992

Attest:

HARRY F. MANBECK, JR.

*Attesting Officer*  *Commissioner of Patents and Trademarks*